(12) United States Patent
Gunter

(10) Patent No.: US 10,959,599 B1
(45) Date of Patent: Mar. 30, 2021

(54) SANITIZING MAT

(71) Applicant: Jaime Gunter, Argyle, TX (US)

(72) Inventor: Jaime Gunter, Argyle, TX (US)

( * ) Notice: Subject to any disclaimer, the term of this patent is extended or adjusted under 35 U.S.C. 154(b) by 29 days.

(21) Appl. No.: 16/253,425

(22) Filed: Jan. 22, 2019

(51) Int. Cl.
*A47L 23/26* (2006.01)
*A47G 27/02* (2006.01)
*B32B 3/00* (2006.01)

(52) U.S. Cl.
CPC ............ *A47L 23/266* (2013.01); *A47G 27/02* (2013.01); *B32B 3/00* (2013.01); *Y10T 428/23* (2015.01)

(58) Field of Classification Search
CPC .. Y10T 428/23; Y10T 428/239; A47L 23/266; A47G 27/02; A61L 2/18
See application file for complete search history.

(56) References Cited

U.S. PATENT DOCUMENTS

| | | | |
|---|---|---|---|
| 2,521,817 A | 9/1950 | Andresen et al. | |
| 3,067,913 A | 12/1962 | Allison | |
| 4,027,355 A | 6/1977 | Mead et al. | |
| 4,285,075 A * | 8/1981 | Nelson | A47K 17/00 4/251.1 |
| 6,289,528 B1 | 9/2001 | Ridder et al. | |
| 6,532,618 B2 | 3/2003 | Koch | |
| 8,209,811 B2 | 7/2012 | Jordan et al. | |
| 9,451,871 B1 | 9/2016 | Seaberg et al. | |
| 9,457,383 B1 | 10/2016 | Skerven | |
| 9,579,410 B2 | 2/2017 | Simmons et al. | |
| 2009/0098031 A1 | 4/2009 | Crist | |
| 2013/0174793 A1* | 7/2013 | Powell | A01K 13/001 119/652 |

* cited by examiner

*Primary Examiner* — Alexander S Thomas
(74) *Attorney, Agent, or Firm* — Cramer Patent & Design, PLLC; Aaron R. Cramer

(57) ABSTRACT

A sanitizing floor mat is fashioned as a traditionally configured flexible floor mat having a plurality of apertures in an upper section. The upper section is attached to a lower section via a hinged section. An antibacterial insert is provided and is configured to be removably secured within mat in the space between the upper section and lower section and in environmental communication with the plurality of apertures.

10 Claims, 3 Drawing Sheets

SANITIZING MAT

FIELD OF THE INVENTION

The presently disclosed subject matter is directed to a sanitizing mat.

BACKGROUND OF THE INVENTION

As anyone who works in a medical environment knows, cleanliness is of the utmost importance in reducing the chances of infection and improving one's overall heath. While hands, skin and even clothing can be easily cleaned or contained, footwear is extremely difficult. It is not uncommon for a medical person to walk across a dirty parking lot, through hospital hallways and right into a patient's room.

While protective booties are used in surgical rooms, they are not practical every time a medical care person walks in and out of a patient's space. This same concern is also present in other public spaces such as schools, airports, business buildings, as well as private homes, where all kinds of contamination, germs, viruses, bacteria, and the like can be brought indoors where footwear not only contaminates other surfaces but can make anyone else present sick as well.

Accordingly, there exists a need for a means by which footwear can be kept clean to reduce the chances of spreading germs and bacteria without the disadvantages as described above. The development of the Sanitizing Floor Mat fulfills this need.

SUMMARY OF THE INVENTION

The principles of the present invention provide for a sanitizing mat, comprising a sanitizing pad which is removably placed between a lower section of the sanitizing mat and an upper section of the sanitizing mat. The lower section has a pair of sidewalls, a rear wall, a front wall, and a bottom wall. The upper section has a pair of sidewalls, a rear wall, a front wall, and an upper wall. The mat also comprises a hinged section located at a rear wall of the lower section and the upper section and an interstitial space between the upper section and the lower section which is capable of fully receiving the sanitizing pad. The lower section and the upper section include a unitary material that is capable of withstanding repeated forces of being trod upon, as well as environmental factors that include weather.

The sanitizing pad may be coextensive with an area defined between the lower section and the upper section and may be coextensive with an area smaller than the area defined between the lower section and the upper section. The lower section and the upper section may be integral with each other and generally rectangular in cross-section. The sanitizing pad may be rectangular in cross-section and may be made of cloth and incorporates a cleansing composition.

The sanitizing pad may be made of absorbing fabric and incorporates the cleansing composition and may be selected from the group consisting of an anti-bacterial cleansing composition, an anti-microbial cleansing composition, or other sanitizing compound cleansing composition. The lower surface of the bottom wall of the lower section has an anti-slip surface attached, affixed, or otherwise bonded.

The anti-slip surface may be coextensive with the bottom wall of the lower section or a portion. While the top wall of the upper section is capable of having a decorative indicium. The decorative indicia may be painted, embossed, carved or stamped, or otherwise located thereon. Located on the top wall of the upper section may be a plurality of apertures. The apertures may provide environmental communication with an exterior environment and the interstitial space between the lower section and the upper section when the upper section is placed on the lower section. The hinged section may comprise a continuous wall that serves as both the rear wall for the lower section and the rear wall for the upper section.

The sanitizing mat may provide a way to sanitize a footwear that is being worn by a wearer or is removed from the wearer. The sanitizing pad may be placed in the interstitial space and the upper section is placed over the lower section. The apertures may enable the cleansing composition of the sanitizing pad to effectively contact a bottom of the footwear that treads thereupon.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

Figure 1:
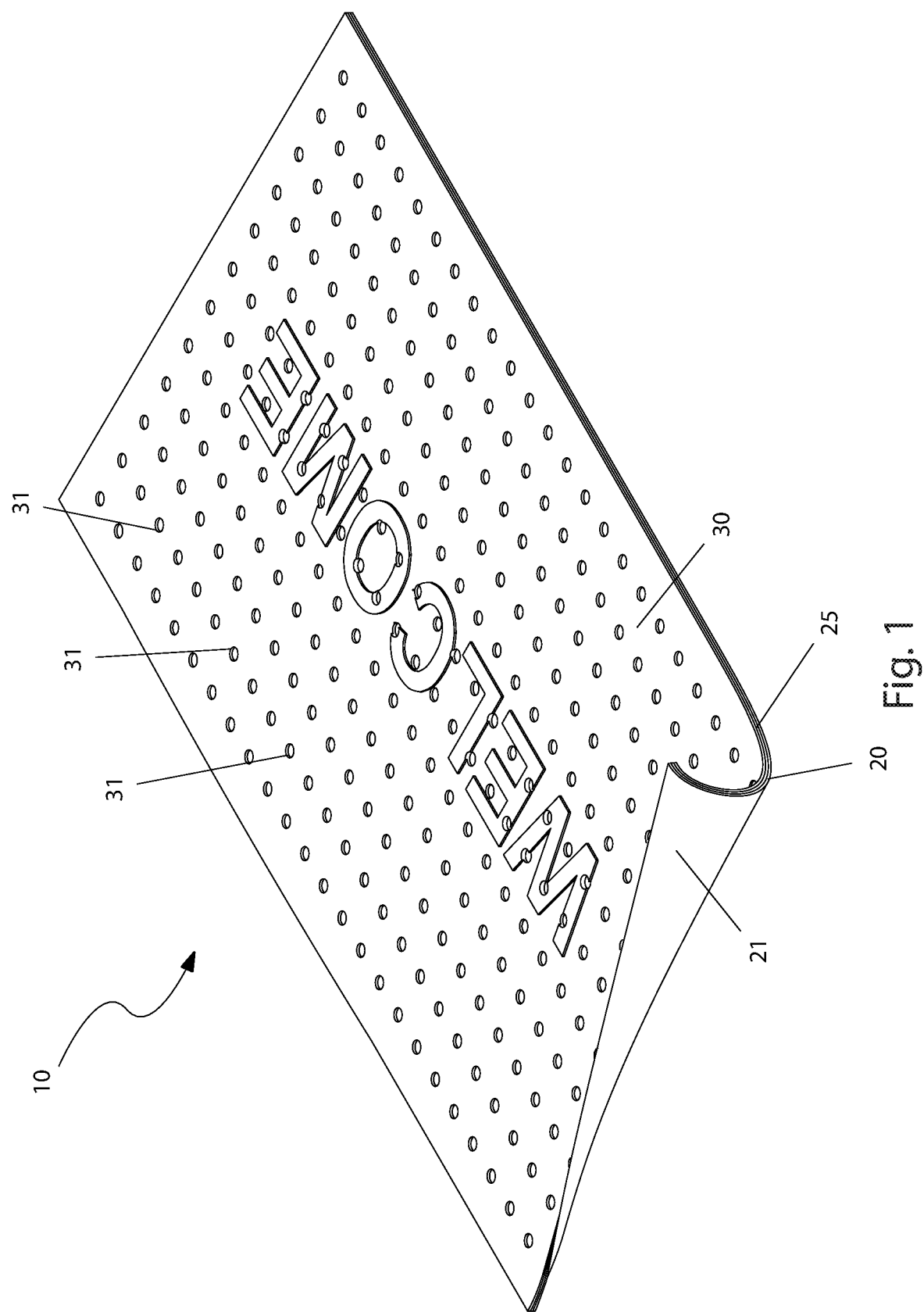
FIG. 1 is a top perspective view of a sanitizing mat 10, according to a preferred embodiment of the present invention.

10 sanitizing mat
15 hinged section
20 lower section
21 anti-slip surface
25 sanitizing pad
30 upper section
31 aperture 1. Description of the Invention The best mode for carrying out the invention is presented in terms of its preferred embodiment, herein depicted within FIGS. 1 through 3. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

Referring now to FIG. 1, it is shown that there is a sanitizing mat 10 that essentially comprises an assembly having multiple features that are particularly suited for providing a way to sanitize footwear. The sanitizing mat (herein described as the "mat") 10 can sanitize the footwear as it rests thereon, wither being worn by a wearer or removed from the wearer. Also, the sanitizing mat 10 may be located at an ingress or egress location at a doorway or located at commonly tread positions to enable those who traverse over the mat 10 to sanitize their footwear upon contact with the mat 10.

Figure 2:
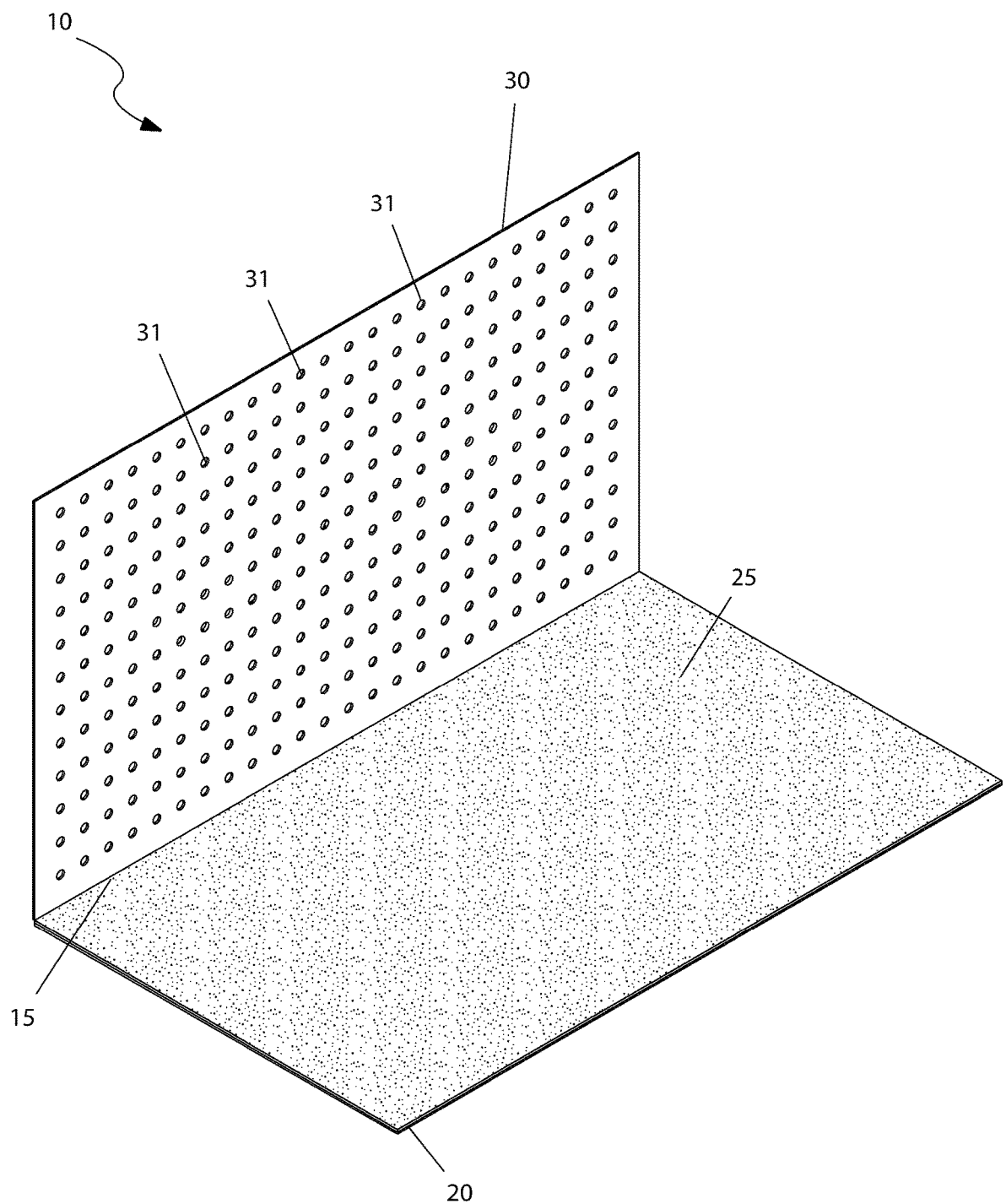
FIG. 2 is a top perspective view of the sanitizing mat 10, showing the upper section 30 extended away from the lower section 20 to expose the sanitary pad 25, according to a preferred embodiment of the present invention; and, FIG. 3 is a top perspective view of the sanitizing mat 10, showing the upper section 30 extended away from the lower section 20 with the sanitary pad 25 removed, according to a preferred embodiment of the present invention.
Figure 3:
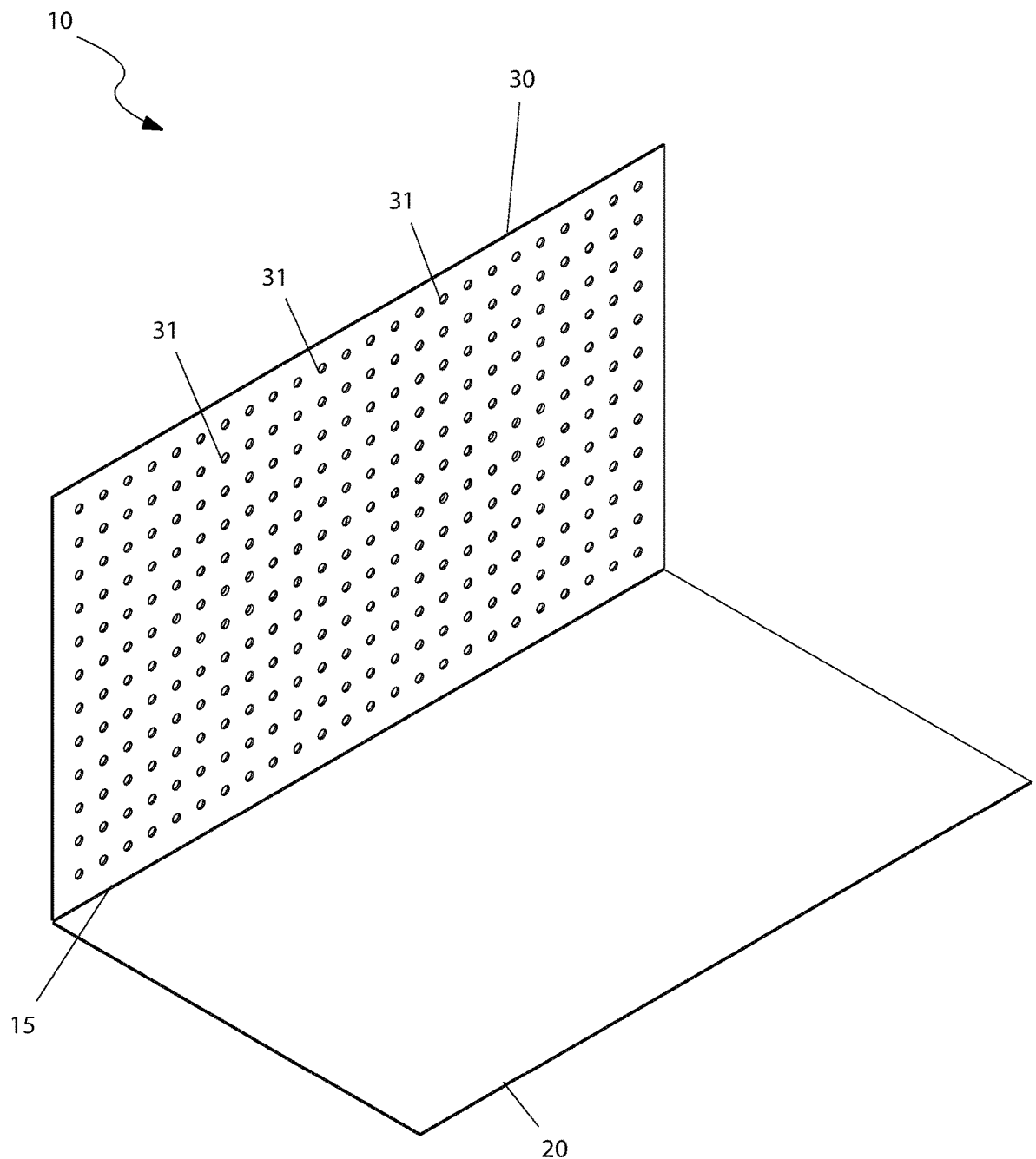

The mat 10 in a preferred embodiment comprises a sanitizing pad 25 that is removably placed between a lower section 20 and an upper section 30. Preferably, the sanitizing pad 25 is coextensive with the area defined between the lower section 20 and upper section 30 (as is shown in FIG. 2) but can also have a smaller area than the area defined between the lower section 20 and upper section 30. Even though some embodiments may comprise instances where the sanitizing pad 25 comprises a larger area than the area defined between the lower section 20 and upper section 30, it is appreciated that this is not preferred. In a preferred embodiment, the lower section 20 and upper section 30 are integral with each other and generally rectangular in cross-section. The sanitizing pad 25 is also rectangular in cross-section.

The sanitizing pad 25 is preferably fabricated out of cloth or other absorbing fabric and incorporates a cleansing composition. Such as cleansing composition can be an anti-bacterial, an anti-microbial, or other sanitizing compound adsorbed, absorbed, coated, impregnated, or otherwise integral therewith. The sanitizing pad 25 is intended to be disposable after a few instances of use or periods of time and replaced with a fresh pad 25.

The lower section 20 has a pair of sidewalls, a rear wall, a front wall, and a bottom wall. The upper section 30 has a pair of sidewalls, a rear wall, a front wall, and an upper wall. A hinged section 15 is located at the rear walls of both the lower section 20 and upper section 30. In some embodiments, the hinged section 30 is merely a continuous wall that serves as both the rear wall for the lower section 20 and the rear wall for the upper section 30. In such an embodiment, it is seen that the lower section 20 and upper section 30 are a unitary construction. The lower section 20 and upper section are preferably coextensive with each other. In such an embodiment, when the upper section 30 is placed over the lower section 20 due to the hinged section 15, the sidewalls of the upper section 30 and lower section 20 are coextensive, the front walls of the upper section 30 and lower section 20 are coextensive and abut each other. The interstitial space between the upper section 30 and lower section 20 is capable of fully receiving the sanitizing pad 25 therein. The lower section 20 and upper section 30 therefore preferably comprise a unitary material that is capable of withstanding repeated forces of being trod upon, as well as environmental factors such as weather.

The lower surface of the bottom wall of the lower section 20 has an anti-slip surface 21 attached, affixed, or otherwise bonded thereto. The anti-slip surface 21 can be coextensive with the entirety of the bottom wall of the lower section 20 or a portion thereof. The top wall of the upper section 30 is capable of having a decorative indicia thereon. The decorative indicia can be painted, embossed, carved or stamped, or otherwise located thereon. Located on the top wall of the upper section 30 is a plurality of apertures 31. The plurality of apertures 31 can be any size or shape and configured in any pattern, wither in a matrix or random. The plurality of apertures 31 provide environmental communication with the exterior environment and the interstitial space between the lower section 20 and upper section 30 when the upper section 30 is placed on the lower section 30. When the sanitizing pad 25 is placed in the interstitial space, and the upper section 30 is placed over the lower section 20, the plurality of apertures 31 enable the cleansing composition of the sanitizing pad 25 to effectively contact the bottoms of footwear that treads thereupon.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

The invention claimed is:

1. A sanitizing mat, comprising:
a sanitizing pad removably placed between a lower section of said sanitizing mat and an upper section of said sanitizing mat, said lower section has a pair of sidewalls, a rear wall, a front wall, and a bottom wall, said upper section has a pair of sidewalls, a rear wall, a front wall, and an upper wall;
a hinged section located at a rear wall of said lower section and said upper section;
an interstitial space between said upper section and said lower section is fully receiving said sanitizing pad therein, wherein said lower section and said upper section therefore include a unitary material that is withstanding repeated forces of being trod upon, as well as environmental factors that include weather; and
a cleansing composition having a sanitizing compound cleansing composition;
wherein said hinged section is a continuous wall that serves as both said rear wall for said lower section and said rear wall for said upper section;
wherein said sanitizing pad is coextensive with an area defined between said lower section and said upper section;
wherein said sanitizing pad is coextensive with an area smaller than said area defined between said lower section and said upper section;
wherein said top wall of said upper section includes a decorative indicia thereon;
wherein said decorative indicia is embossed, carved or stamped thereon;
wherein located on said top wall of said upper section is a plurality of apertures; and,
wherein said plurality of apertures enable said cleansing composition of said sanitizing pad to effectively contact a bottom of said footwear that treads thereupon.

2. The sanitizing mat according to claim 1, wherein said lower section and said upper section are integral with each other and generally rectangular in cross-section.

3. The sanitizing mat according to claim 1, wherein said sanitizing pad is rectangular in cross-section.

4. The sanitizing mat according to claim 1, wherein said lower surface of said bottom wall of said lower section has an anti-slip surface attached, affixed, or otherwise bonded thereto.

5. The sanitizing mat according to claim 4, wherein said anti-slip surface is coextensive with said bottom wall of said lower section or a portion thereof.

6. The sanitizing mat according to claim 1, wherein said apertures provide environmental communication with an exterior environment and said interstitial space between said lower section and said upper section when said upper section is placed on said lower section.

7. The sanitizing mat according to claim 1, wherein said sanitizing mat provides a way to sanitize a footwear.

8. The sanitizing mat according to claim 7, wherein said footwear is being worn by a wearer.

9. The sanitizing mat according to claim 8, wherein said footwear is removed from the wearer.

10. The sanitizing mat according to claim 7, wherein said sanitizing pad is placed in said interstitial space and said upper section is placed over said lower section.

\* \* \* \* \*